(12) United States Patent
Obata et al.

(10) Patent No.: US 7,845,480 B2
(45) Date of Patent: Dec. 7, 2010

(54) FRICTIONAL COUPLING DEVICE SUPPORT STRUCTURE AND TRANSMISSION

(75) Inventors: Tatsuo Obata, Toyota (JP); Tetsuya Kohno, Okazaki (JP); Junichi Nishinosono, Toyota (JP); Hirofumi Onishi, Aichi-gun (JP); Yuji Yasuda, Nishikamo-gun (JP); Takanori Nukata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 776 days.

(21) Appl. No.: 11/892,364

(22) Filed: Aug. 22, 2007

(65) Prior Publication Data

US 2008/0060897 A1    Mar. 13, 2008

(30) Foreign Application Priority Data

Sep. 7, 2006   (JP)   .............................. 2006-242923

(51) Int. Cl.
*F16D 25/12* (2006.01)
*F16D 25/0638* (2006.01)

(52) U.S. Cl. ............. 192/85.41; 192/70.14; 192/109 R; 192/85.43

(58) Field of Classification Search ........................ None
See application file for complete search history.

(56) References Cited

U.S. PATENT DOCUMENTS 5,937,985 A * 8/1999 Dover et al. ............... 192/70.2
6,318,534 B1 * 11/2001 Zimprich .................. 192/70.12
6,427,821 B1 * 8/2002 Lee .......................... 192/109 F
2003/0188950 A1 * 10/2003 Kinoshita ............... 192/109 R

FOREIGN PATENT DOCUMENTS

| JP | 05-3659 U | 1/1993 |
| JP | 2000-266080 A | 9/2000 |
| JP | A-2001-193756 A | 7/2001 |
| JP | A-2002-250367 A | 9/2002 |
| JP | 2003-301861 A | 10/2003 |

* cited by examiner

*Primary Examiner*—David D Le
*Assistant Examiner*—Ryan Dodd
(74) *Attorney, Agent, or Firm*—Kenyon & Kenyon LLP

(57) ABSTRACT

A support structure for supporting a brake, as a frictional coupling device, includes a snap ring, a friction plate, and a back plate. The snap ring fits in a groove that extends in a circle. The back plate is disposed between the friction plate and the snap ring. The back plate is pressed against the snap ring. The snap ring has a first end face that faces the back plate and a second end face that faces the opposite side from the first end face and is in contact with a sidewall of the groove. The back plate has an end face that is in contact with the first end face. The static friction coefficient between the first end face of the snap ring and the end face of the back plate is smaller than that between the second end face of the snap ring and the sidewall of the groove.

10 Claims, 10 Drawing Sheets

FRICTIONAL COUPLING DEVICE SUPPORT STRUCTURE AND TRANSMISSION

INCORPORATION BY REFERENCE

The disclosure of Japanese Patent Application No. 2006-242923 filed on Sep. 7, 2006 including the specification, drawings and abstract is incorporated herein by reference in its entirety.

BACKGROUND OF THE INVENTION

1. Field of the Invention

The invention relates to a support structure for a frictional coupling device and a transmission, and particularly to a support structure that includes a snap ring for restricting the movement of a friction plate in the axial direction and a transmission incorporating such a frictional coupling device support structure.

2. Description of the Related Art

JP-A-2002-250367 describes a multi-plate clutch device that is configured to reduce the space for accommodating the clutch device. This clutch device includes first brake plates and second brake plates that are alternately arranged in the axial direction and a piston that presses the first brake plates and the second brake plates against each other, an end plate that is provided on the opposite side from the piston in the axial direction and receives the load from the piston, and a snap ring that is provided on the outer side of the end plate.

Further, JP-A-2001-193756 describes an overlap clutch assembly for an automatic transmission, which is configured to reduce its longitudinal dimension (to be compact in size) and thereby improve the accuracy in shifting the automatic transmission from the neutral position to the reverse-drive position. This clutch assembly includes clutch plates, clutch discs, a piston that is hydraulically driven in the forward direction to frictionally engage the clutch plates and the clutch discs, a stopper plate that is provided on the opposite side from the piston with respect to the clutch plates and the clutch discs, and a return spring that is provided between the stopper plate and the piston and that brings the piston back to the initial position when the clutch is released.

The frictional coupling device support structure described in JP-A-2001-193756 uses the snap ring to restrict the movement of the friction plates when they are being hydraulically driven. However, because such a snap ring is a ring-shaped member that is disconnected at a position on its circumference, that is, it is shaped like the letter "C", not a complete ring, the rigidity at the disconnected portion of the snap ring is relatively low. Therefore, a gap may be created between the snap ring and the bottom surface of a groove in which the snap ring fits. As the hydraulic pressure applied to the friction plates acts on the snap ring repeatedly, the position of the snap ring may shift towards the outer side of the groove, and such a shift of the position of the snap ring may cause the bearing area between the snap ring and the groove to decrease to an insufficient level.

SUMMARY OF THE INVENTION

It is an object of the invention to provide a frictional coupling device support structure and a transmission that provide a sufficient bearing area between the snap ring and the groove over the entire circumference.

A first aspect of the invention relates to a frictional coupling device support structure including a snap ring, a friction plate, and a plate member. The snap ring fits in a groove extending in a circle about a predetermined axis. The position of the friction plate is restricted by the snap ring in the direction in which the predetermined axis extends. The friction plate is engaged by being pressed against the snap ring in the direction in which the predetermined axis extends. The plate member is arranged between the friction plate and the snap ring and is pressed against the snap ring. The snap ring has a first end face that faces the plate member and a second end face that face the opposite side from the first end face in the direction in which the predetermined axis extends and is in contact with a sidewall of the groove. The plate member includes a third end face that is in contact with the first end face. The static friction coefficient between the first end face and the third end face is smaller than the static friction coefficient between the second end face and the sidewall of the groove.

According to the frictional coupling device support structure configured as described above, the static friction coefficient between the first end face and the third end face is smaller than the static friction coefficient between the second end face and the sidewall of the groove. This minimizes the possibility that the snap ring be pulled out by the plate member and thus displaced in the coming-off direction when the plate member is urged to move in the coming-off direction of the snap ring. As such, a sufficient bearing area can be obtained between the snap ring and the groove over the entire circumference about the predetermined axis.

The above-described frictional coupling device support structure may be such that an oil groove is formed in at least one of the first end face and the third end face. According to this structure, the static friction coefficient between the first end face and the third end face can be more effectively reduced.

The above-described frictional coupling device support structure may be such that a surface treatment for reducing the friction between the first end face and the third end face is applied to at least one of the first end face and the third end face. According to this structure, the static friction coefficient between the first end face and the third end face can be more effectively reduced.

The above-described frictional coupling device support structure may be such that the second end face has a rough surface that is rougher than the surface of the first end face. According to this structure, the static friction coefficient between the second end face and the sidewall of the groove can be more effectively increased.

The above-described frictional coupling device support structure may further include a piston member and an elastic member. The piston member is disposed on the opposite side from the plate member with respect to the friction plate. The piston member presses the friction plate by moving towards the plate member. The elastic member is connected at one end to the piston member and at the other end to the plate member. The elastic member urges the piston member in a direction away from the plate member. On the other hand, the elastic member presses the plate member against the snap ring. According to this structure, any of the effects described above can be obtained with a frictional coupling device in which the friction plate is disengaged using the elastic force of the elastic member.

The above-described frictional coupling device support structure may be such that the plate member includes an end plate portion to which the other end of the elastic member is connected and an additional plate portion that is interposed between the end plate member and the snap ring and has the third end face. This structure can effectively minimize the possibility that the snap ring be pulled out by the plate member and thus displaced in the coming-off direction when the plate member is urged to move in the coming-off direction of the snap ring.

A transmission according to the invention includes the frictional coupling device support structure according to the first aspect of the invention with or without any of the modifications described above. In this transmission, the planetary gearsets can operate more accurately and the reliability of the automatic transmission 10 improves accordingly.

As described above, the frictional coupling device support structure and the transmission according to the invention provide a sufficient bearing area between the snap ring and the groove over the entire circumference.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EXEMPLARY EMBODIMENTS

Figure 1:
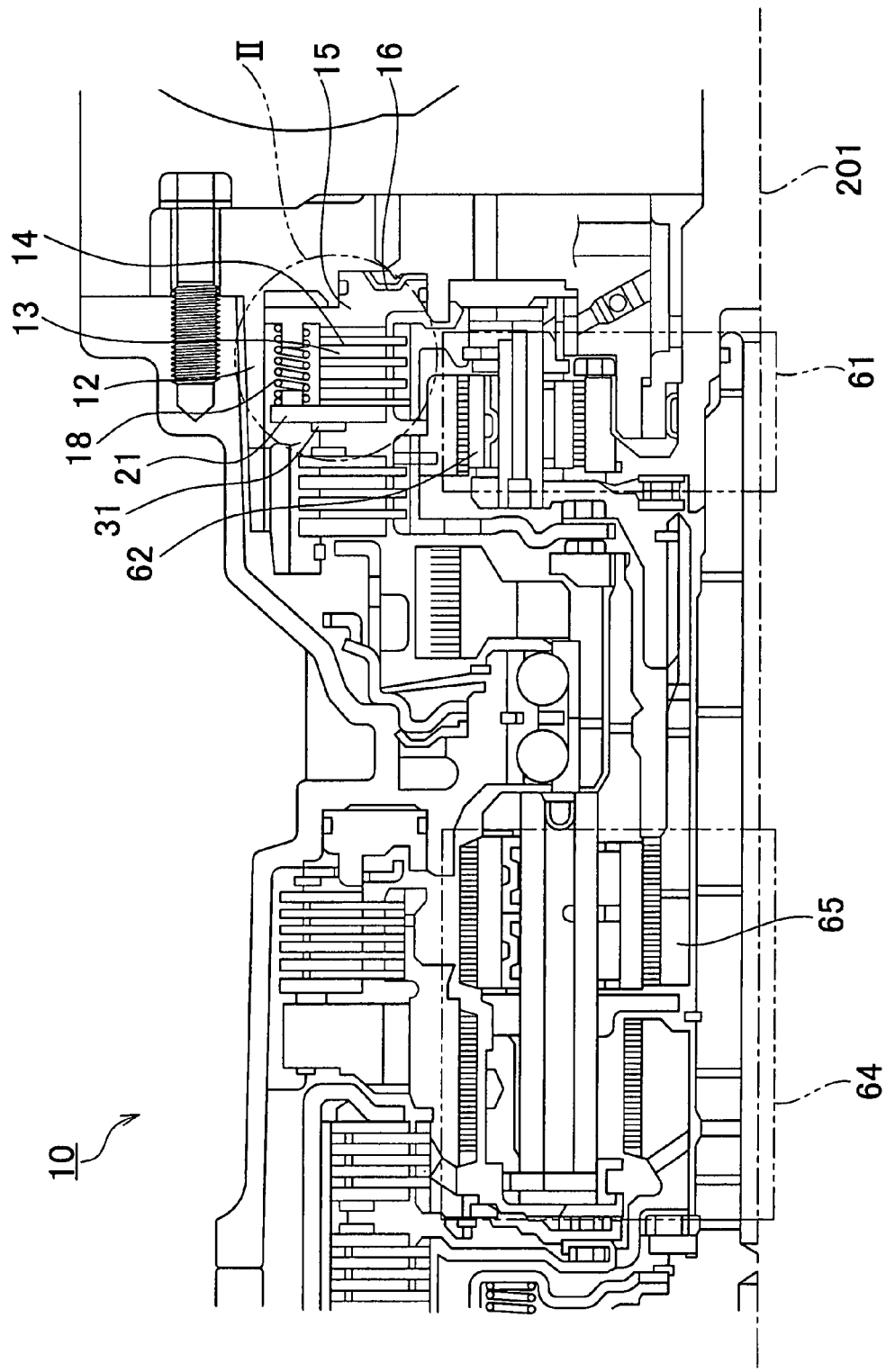
FIG. 1 is a cross sectional view of an automatic transmission that is mounted on a vehicle.

Hereinafter, exemplary embodiments of the invention will be described with reference to the accompanying drawings.

Note that like components and elements shown in the drawings are denoted by like numerals.

First Exemplary Embodiment

FIG. 1 is a cross sectional view of an automatic transmission 10 that is mounted on a vehicle. Specifically, FIG. 1 shows the cross section of a portion of the automatic transmission 10. Referring to FIG. 1, the automatic transmission 10 includes, as a plurality of planetary gearsets, an UD (Under-Drive) planetary gearset 61 and a ravigneaux type planetary gearset 64. Using these planetary gearsets in combination, the automatic transmission 10 transmits the rotational force input from the internal combustion engine while reducing or increasing the rotational speed or transmits the rotational force in the revise rotational direction. The UD planetary gearset 61 is disposed in a case 12. The automatic transmission includes an oil pan for storing the engine oil, which is not shown in the drawings. The engine oil stored in the oil pan is scooped up by a gear in the automatic transmission 10, whereby the engine oil is supplied as a lubricant to various portions of the automatic transmission 10.

Figure 2:
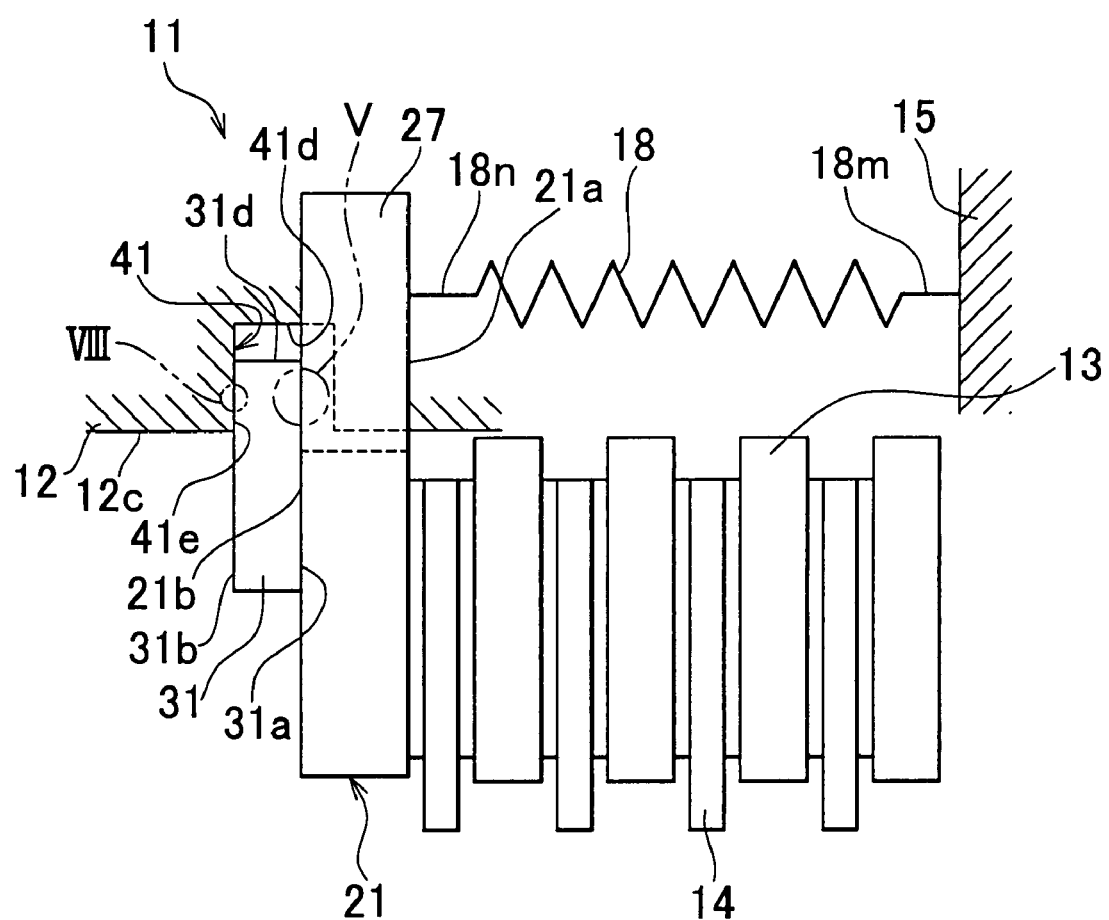
FIG. 2 is a cross-sectional view showing a brake support structure according to the first exemplary embodiment of the invention.

FIG. 2 is a cross-sectional view showing a brake support structure according to the first exemplary embodiment of the invention. Note that this cross-sectional view shows the portion indicated by the two-dotted line circle II in FIG. 1.

Referring to FIG. 1 and FIG. 2, the automatic transmission 10 includes a brake 11, which is a frictional coupling device. When engaged, the brake 11 locks the rotation of a planetary carrier 62 of the UD planetary gearset 61 and the rotation of a sun gear 65 of the ravigneaux type planetary gearset 64. The brake 11 includes friction plates 13, 14, a back plate 21, and a snap ring 31, which are all disposed within the case 12. The friction plates 13, 14 may be provided in plurality, respectively.

The case 12 has an inner peripheral surface 12c that extends around an axis 201. The axis 201 is the rotational axis for the UD planetary gearset 61 and the ravigneaux type planetary gearset 64.

The friction plates 13 are fixed to the case 12, and the friction plates 14 are fixed to the planetary gearset side. The friction plates 13 and the friction plates 14 are movable in the direction in which the axis 201 extends and are fixed to the case 12 and the planetary gearset side, respectively, so as not to rotate in the circumferential direction about the axis 201. Each of the friction plates 13, 14 is ring-shaped, extending in a circle on the inner side of the inner peripheral surface 12c. The friction plates 13 and the friction plates 14 are alternately arranged side by side in the direction in which the axis 201 extends.

The brake 11 further includes a brake piston 15. The brake piston 15 is provided adjacent to the friction plates 13, 14 in the direction in which the axis 201 extends. A hydraulic chamber 16 is formed in the case 12. The hydraulic chamber 16 is provided adjacent to the brake piston 15 in the direction in which the axis 201 extends. That is, the brake piston 15 is located between the friction plates 13, 14 and the hydraulic chamber 16.

As a hydraulic pressure is supplied to the hydraulic chamber 16, the brake piston 15 travels in the direction in which the axis 201 extends and thereby presses the friction plates 13, 14. Being pressed by the brake piton 15, the friction plates 13 and the friction plates 14 adhere to each other due to friction. Thus, the friction plates 13 and the friction plates 14 engage each other, whereby the rotation of the planetary carrier 62 and the rotation of the sun gear 65 are locked.

Figure 3:
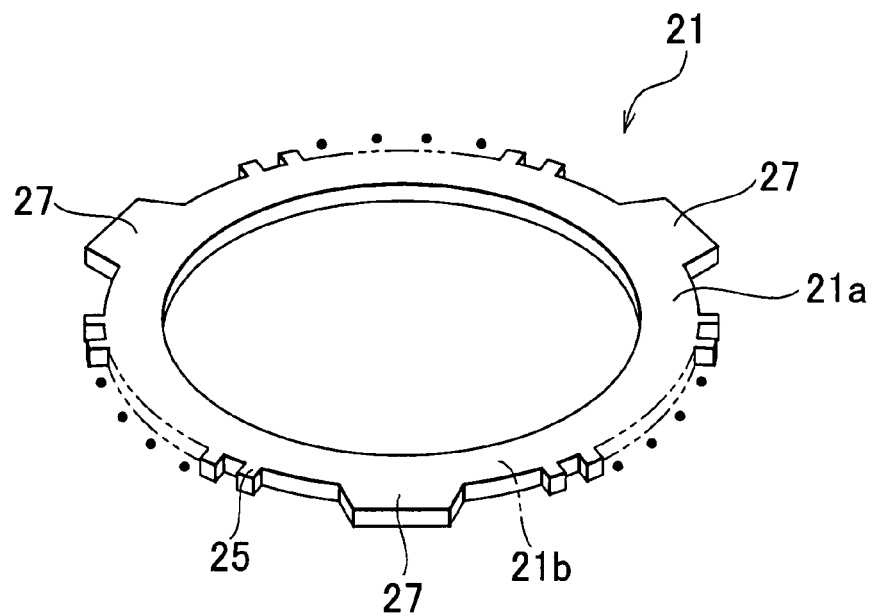
FIG. 3 is a perspective view showing the back plate in FIG. 2.

FIG. 3 is a perspective view showing the back plate 21. The back plate 21 is made of metal. The back plate 21 is provided between the snap ring 31 and the friction plates 13, 14. The snap ring 31, the back plate 21, and the friction plates 13, 14 are located in line in the direction in which the axis 201 extends. The back plate 21 is fixed to the case 12.

The back plate 21 is ring-shaped extending in a circle about the axis 201. The back plate 21 has an end face 21a and an end face 21b. The end face 21a and the end face 21b face the opposite sides in the direction in which the axis 201 extends. The end face 21a and the end face 21b each extend in a circle about the axis 201. The end face 21a faces the side where the friction plates 13, 14 are located. The end face 21b faces the snap ring 31. The end face 21a and the end face 21b each extend on a plane perpendicular to the axis 201.

The back plate 21 has splines 25. The splines 25 engage corresponding splines formed in the inner peripheral surface 12c, which are not shown in the drawings. Thus, the back plate 21 is connected to the case 12 such that the back plate 21 is movable in the direction in which the axis 201 extends and is not rotatable in the circumferential direction about the axis 201. The back plate 21 includes a plurality of flanges 27. Each flange 27 protrudes towards the outer side in the radial direction with respect to the axis 201. The flanges 27 are spaced apart from each other in the circumferential direction about the axis 201.

The brake 11 includes return springs 18. The return springs 18 are oriented in the direction in which the axis 201 extends. Each of the return springs 18 has an end portion 18m via which the return spring 18 is connected to the brake piston 15 and an end portion 18n via which the return spring 18 is connected to the back plate 21, more specifically, to a corresponding one of the flanges 27 of the back plate 21. Thus, the multiple return springs 18 are provided to correspond to the multiple flanges 27 of the back plate 21.

The snap ring 31 is located between the return springs 18 and the friction plates 13, 14 as viewed in the radial direction with respect to the axis 201. The elastic force of the return springs 18 urges the brake piston 15 to move away from the back plate 21 in the direction in which the axis 201 extends. The back plate 21 is pressed against the snap ring 31 by the elastic force of the return springs 18.

When the supply of hydraulic pressure to the hydraulic chamber 16 is stopped, the brake piston 15 travels away from the back plate 21 due to the elastic force of the return springs 18, so that the friction plates 13 and the friction plates 14 disengage from each other, allowing the planetary carrier 62 and the sun gear 65 to rotate.

Figure 4:
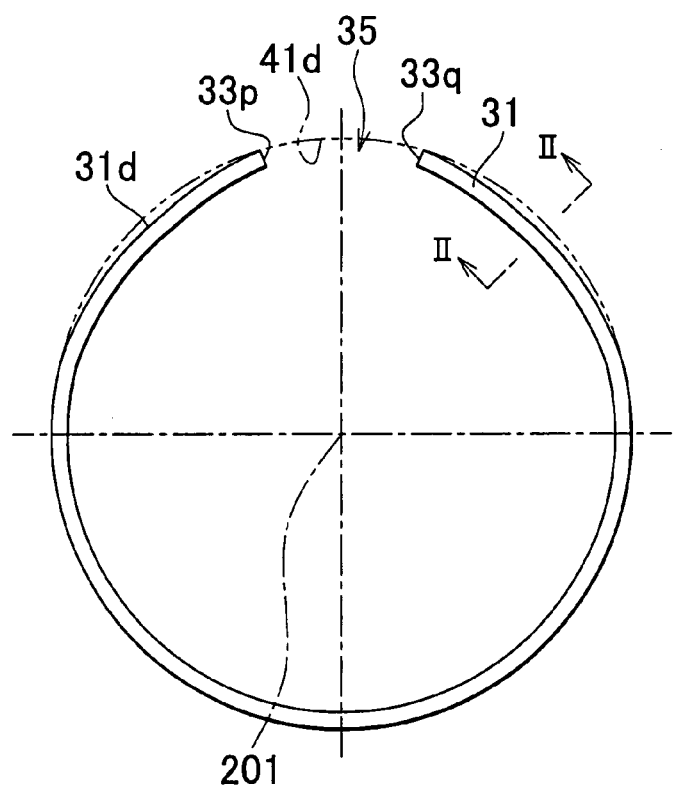
FIG. 4 is a view showing the snap ring shown in FIG. 2.

FIG. 4 is a view showing the snap ring 31, as viewed in the direction in which the axis 201 extends. Note that FIG. 2 is the cross sectional view taken along the line II-II in FIG. 4.

Referring to FIG. 2 and FIG. 4, a groove 41 is formed in the case 12, more specifically, in the inner peripheral surface 12c of the case 12. The groove 41 extends in a circle about the axis 201. The cross section of the groove 41 is generally rectangular. The groove 41 has a bottom surface 41d and a sidewall 41e. The bottom surface 41d is the internal wall of the groove 41 located at the deepest position from the inner peripheral surface 12c. The sidewall 41e is present between the bottom surface 41d and the inner peripheral surface 12c. The sidewall 41e extends in a circle about the axis 201 on a plane perpendicular to the axis 201. The sidewall 41e faces the side where the snap ring 31 and the back plate 21 are located.

The snap ring 31 fit in the groove 41. The snap ring 31 restricts the positions of the friction plates 13, 14 in the direction in which the axis 201 extends. Specifically, the snap ring 31 blocks the movement of the friction plates 13, 14 when they are pressed by the brake piston 15.

The snap ring 31 is made of metal. The snap ring 31 is a ring-shaped member that is disconnected at a position on its circumference, that is, it is shaped like the letter "C". The snap ring 31 has a pair of mating faces 33p, 33q. The mating faces 33p, 33q face each other across a gap 35 therebetween in the circumferential direction about the axis 201. The rigidity of the snap ring 31 is relatively low at the phase position at which the gap 35 is provided and is relatively high at the phase position opposite from the gap 35. Thus, the pressing force (i.e., binding force) that is applied from the snap ring 31 to the bottom surface 41d of the groove 41 is relatively weak in the phase region in the upper half of FIG. 4 and is relatively strong in the phase region in the lower half of FIG. 4.

Because of such characteristics of the snap ring 31, when the snap ring 31 fits in the groove 41, an outer peripheral surface 31d of the snap ring 31, which is a peripheral surface of the snap ring 31 that faces the bottom surface 41d of the groove 41, and the bottom surface 41d of the groove 41 are placed in intimate contact with each other at the phase position opposite from the phase position at which the gap 35 is located, while a gap is created between the outer peripheral surface 31d of the snap ring 31 and the bottom surface 41d of the groove 41 in the area close to the mating faces 33p, 33q.

The snap ring 31 is pressed against the sidewall 41e by the force that is transmitted from the back plate 21 to the snap ring 31 in the direction in which the axis 201 extends. The snap ring 31 fits in the groove 41 such that the snap ring 31 is in contact with the sidewall 41e. More specifically, the snap ring 31 fits in the groove 41 such that the snap ring 31 is sandwiched between the sidewall 41e and the end face 21b.

The static friction coefficient between an end face 31a of the snap ring 31 and the end face 21b of the back plate 21 is smaller than that between an end face 31b of the snap ring 31 and the sidewall 41e of the groove 41. These two static friction coefficients, for example, can be determined and compared in the method described below.

To begin with, the case 12 is fixed in position. Load is then applied to the snap ring 31 in the direction in which the axis 201 extends, so that the snap ring 31 is pressed against the sidewall 41e. Then, torque is applied to the snap ring 31 in the rotational direction about the axis 201, and the magnitude of torque at which the snap ring 31 starts slipping on the sidewall 41e is measured. Likewise, the back plate 21 is fixed in position. Load is then applied to the snap ring 31 in the direction in which the axis 201 extends, so that the snap ring 31 is pressed against the end face 21b. Then, torque is applied to the snap ring 31 in the rotational direction about the axis 201, and the magnitude of torque at which the snap ring 31 starts slipping on the end face 21b is measured. Note that these two measurements are performed by applying the same torque to the snap ring 31.

If the results of the measurements indicate that the magnitude of torque at which the snap ring 31 starts slipping on the end face 21b is smaller than the magnitude of torque at which the snap ring 31 starts slipping on the sidewall 41e, it is determined that the static friction coefficient between the end face 31a and the end face 21b is smaller than that between the end face 31b and the sidewall 41e.

Figure 5:
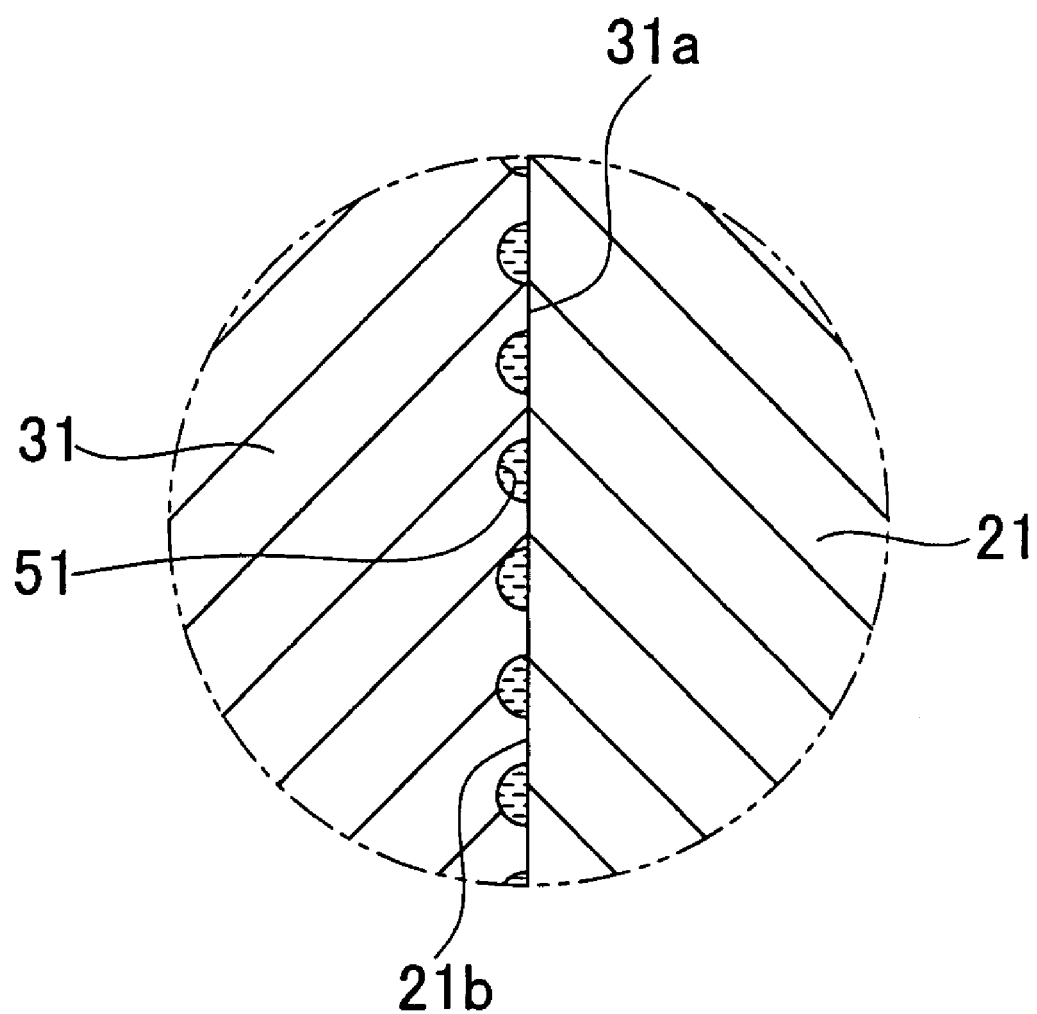
FIG. 5 is a cross sectional view that enlarges the portion indicated by the two-dotted line circle V in FIG. 2.
Figure 6A:
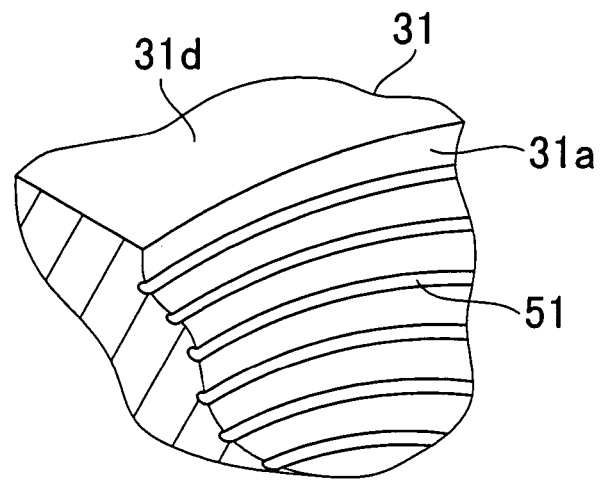
FIGS. 6A, 6B, 6C are perspective views each showing the shapes of oil grooves formed in the snap ring.
Figure 6B:
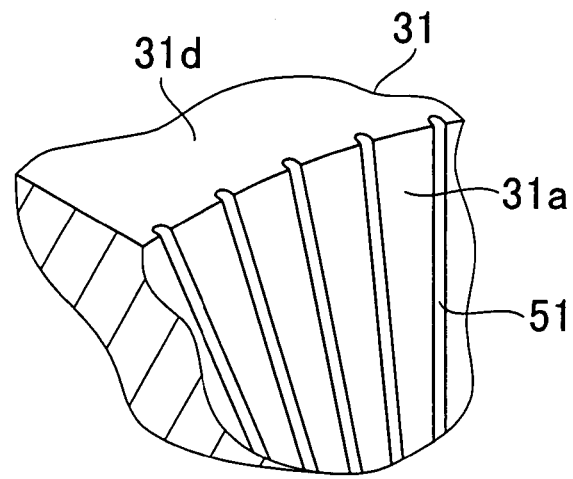
Figure 6C:
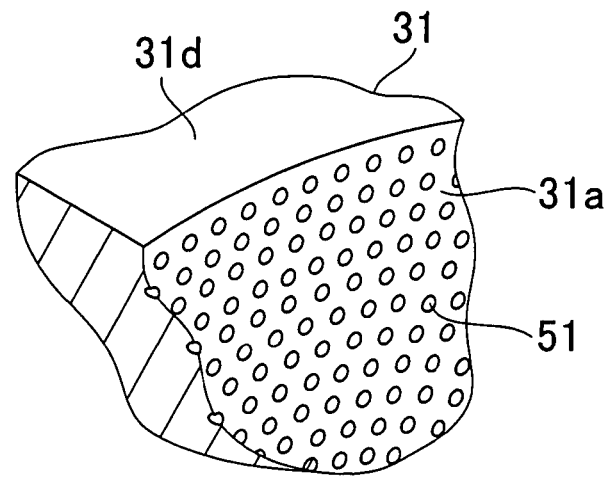

FIG. 5 is an enlarged cross-sectional view of the area indicated by the two-dotted line circle V in FIG. 2. FIG. 6A to FIG. 6C are perspective views each showing the shapes of oil grooves 51 formed in the snap ring 31. Referring to FIG. 5, the oil grooves 51 are formed in the end face 31a of the snap ring 31. FIG. 6A shows an example in which multiple oil grooves 51 are formed such that each oil groove 51 extends in a circle about the axis 201 and the oil grooves 51 are spaced apart from each other in the radial direction with respect to the axis 201. FIG. 6B shows an example in which oil grooves 51 are formed such that each oil groove 51 extends in the radial direction with respect to the axis 201. FIG. 6C shows an example in which oil grooves 51 are formed like dimples in the surface of the end face 31a.

According to the structure descried above, when the automatic transmission 10 is operating, the oil that has been scooped up from the oil pan is retained at the oil grooves 51. Thus, the static friction coefficient between the end face 31a and the end face 21b is effectively reduced and thus made smaller than the static friction coefficient between the end face 31b and the sidewall 41e.

Figure 7:
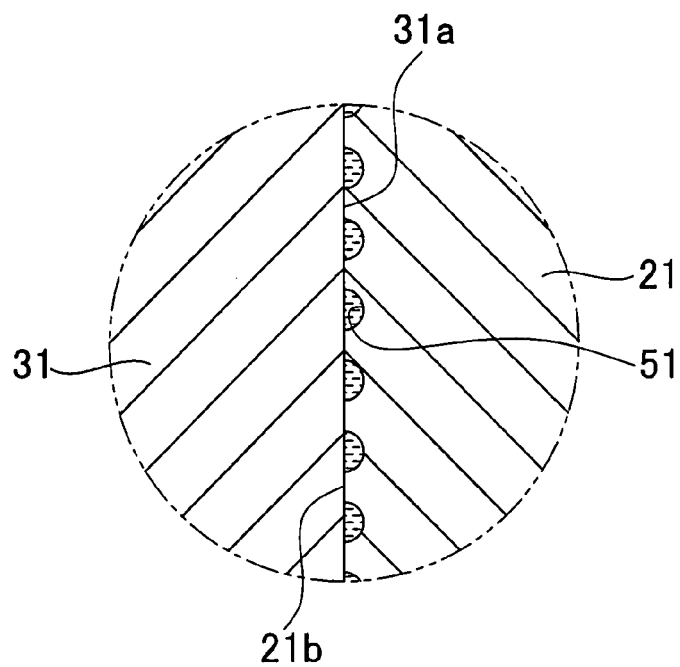
FIG. 7 is a cross-sectional view showing the first modification example of the brake support structure shown in FIG. 2.

FIG. 7 is a cross-sectional view showing the first modification example of the brake support structure shown in FIG. 2. FIG. 7 corresponds to FIG. 5. Referring to FIG. 7, in the first modification example, the oil grooves 51 are formed in the end face 21b of the back plate 21. Also, the oil grooves 51 may be formed both in the end face 31a and in the end face 21b. In either case, the static friction coefficient between the end face 31a and the end face 21b can be effectively reduced.

Figure 8:
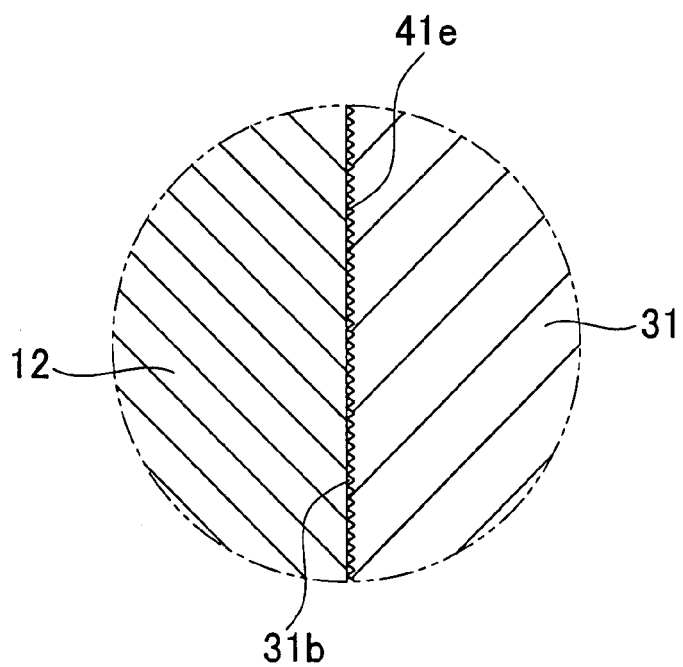
FIG. 8 is a cross-sectional view showing the second modification example of the brake support structure shown in FIG. 2.

FIG. 8 is a cross-sectional view showing the second modification example of the brake support structure shown in FIG. 2. Note that the portion shown in FIG. 8 corresponds to the portion indicated by the two-dotted line circle VIII in FIG. 2. Referring to FIG. 8, in the second modification example, the surface of the end face 31b of the snap ring 31 is rougher than the surface of the end face 31a. Whether the surface of the end face 31b is rougher than the surface of the end face 31a can be determined by, for example, comparing the arithmetic average roughness Ra for the surface of the end face 31b and that for the surface of the end face 31a. That is, the end face 31b has a coarse surface. According to this structure, the static friction coefficient between the end face 31b and the said wall 41e can be effectively increased, so that the static friction coefficient between the end face 31a and the end face 21b is smaller than that between the end face 31b and the sidewall 41e. Note that the surface of the sidewall 41e of the groove 41 may alternatively, or additionally, be made a coarse surface.

Hereinafter, description will be made of how the bearing area between the snap ring 31 and the groove 41 decreases in a comparative brake support structure. In this comparative brake support structure, the static friction coefficient between the end face 31a and the end face 21b is not smaller than that between the end face 31b and the sidewall 41e, and the end faces 31a and 21b each have no oil grooves, and the surface of the end face 31b is not formed as a rough surface.

Figure 9:
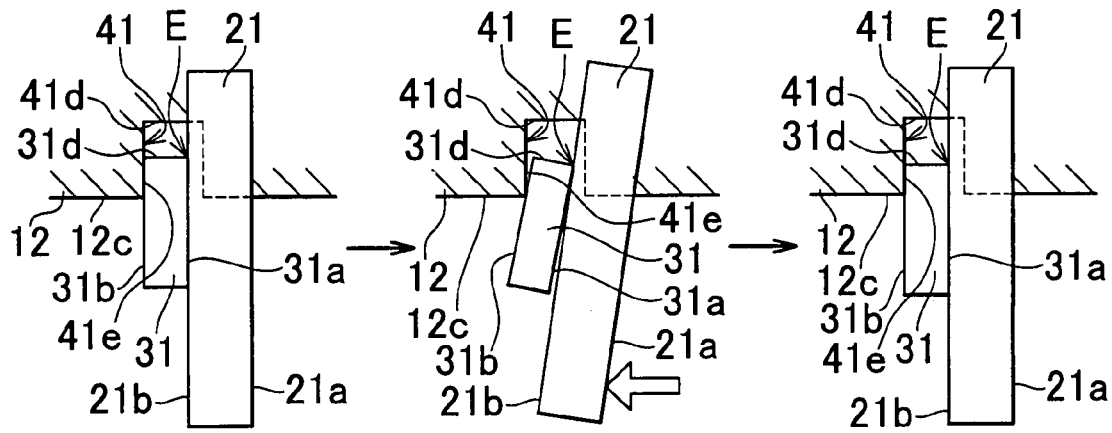
FIG. 9 are cross-sectional views showing the initial state of the snap ring, the hydraulically pressed state of the snap ring, and the hydraulically released state of the snap ring 31, respectively, in a comparative brake support structure.
Figure 10:
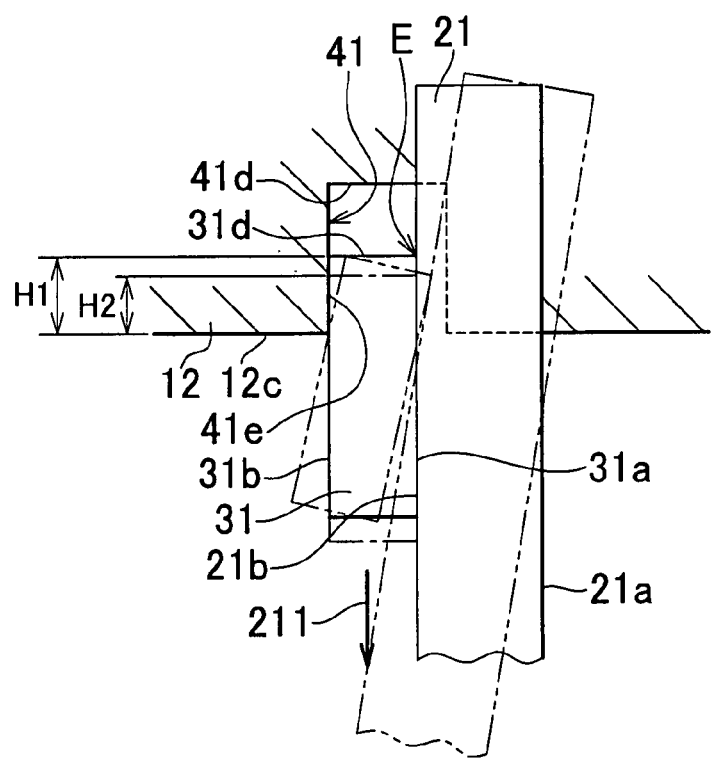
FIG. 10 is a cross sectional view of the brake support structure shown in FIG. 9 in which the view of the hydraulically released state of the snap ring is overlaid on the view of the initial state of the snap ring.

FIG. 9 are cross-sectional views showing the initial state of the snap ring 31, the hydraulically pressed state of the snap ring 31, and the hydraulically released state of the snap ring 31, respectively, in the comparative brake support structure. FIG. 10 is a cross sectional view in which the view of the initial state of the snap ring 31, the view of the hydraulically driven state of the snap ring 31, and the view of the hydraulically released state of the snap ring 31 are overlaid on each other. Note that the FIG. 9 shows a cross section at the phase position close to the mating faces 33p, 33q Referring to FIG. 9 and FIG. 10, a portion of the corner defined by the outer peripheral surface 31d and the end face 31a of the snap ring 31 that faces the back plate 21 is referred to as a "corner E".

In the initial state where the hydraulic pressure has not yet been applied to the snap ring 31, the bearing area between the snap ring 31 and the groove 41 is H1. When a hydraulic pressure is being applied to the snap ring 31, the force applied from the hydraulic chamber 16 to the friction plates 13, 14 is transmitted to the back plate 21 and the snap ring 31. At this time, the inner peripheral side of the back plate 21, under the force from the friction plates 13, 14, inclines towards the snap ring 31, and the snap ring 31 also inclines together with the back plate 21. When the snap ring 31 thus moves, the corner E of the snap ring 31 slips on the surface of the back plate 21. As a result, it appears that the position of the corner E has shifted to the inner side in the radial direction with respect to the axis 201, which is indicated by the arrow 211 in FIG. 10. Because this radial direction corresponds to the direction in which the snap ring 31 moves when it comes off from the groove 41, this direction will hereinafter be referred to also as "the coming-off direction of the snap ring 31" where appropriate.

When the hydraulic pressure is removed, the back plate 21 and the snap ring 31 together return to their initial positions from the inclined positions. At this time, because the corner E of the snap ring 31 is caught on the end face 21b of the back plate 21 due to the frictional force between the snap ring 31 and the back plate 21, the corner E is dragged by the end face 21b as the back plate 21 and the snap ring 31 return to the initial positions, whereby the snap ring 31 is pulled out in the coming-off direction against the frictional force between the snap ring 31 and the sidewall 41e of the groove 41. Thus, after the removal of the hydraulic pressure, the bearing area between the snap ring 31 and the groove 41 becomes H2 that is smaller than H1. Thus, as the application and removal of the hydraulic pressure are repeated, the bearing area between the snap ring 31 and the groove 41 decreases gradually.

Next, description will be made of the effects obtained with the brake support structure according to this exemplary embodiment, which is configured as shown in FIG. 2.

Figure 11:
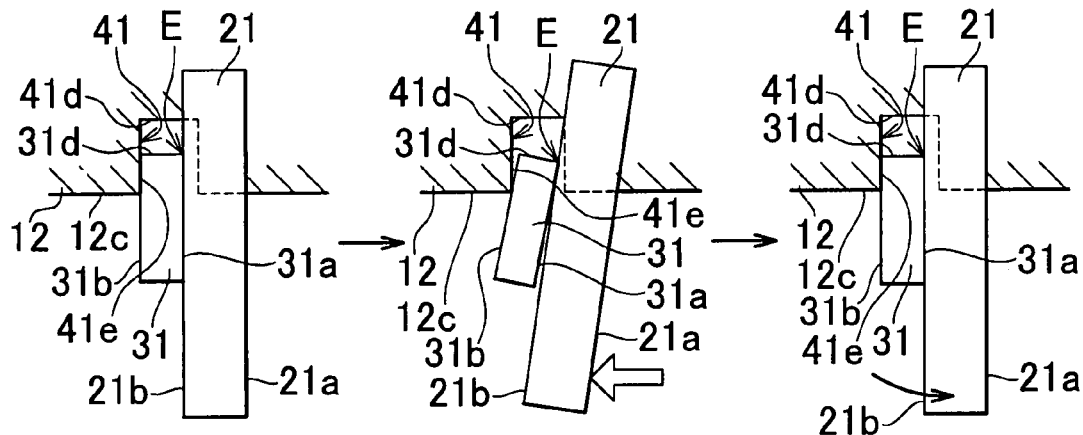
FIG. 11 are cross-sectional views showing the initial state of the snap ring, the hydraulically pressed state of the snap ring, and the hydraulically released state of the snap ring, respectively, in the brake support structure shown in FIG. 2.
Figure 12:
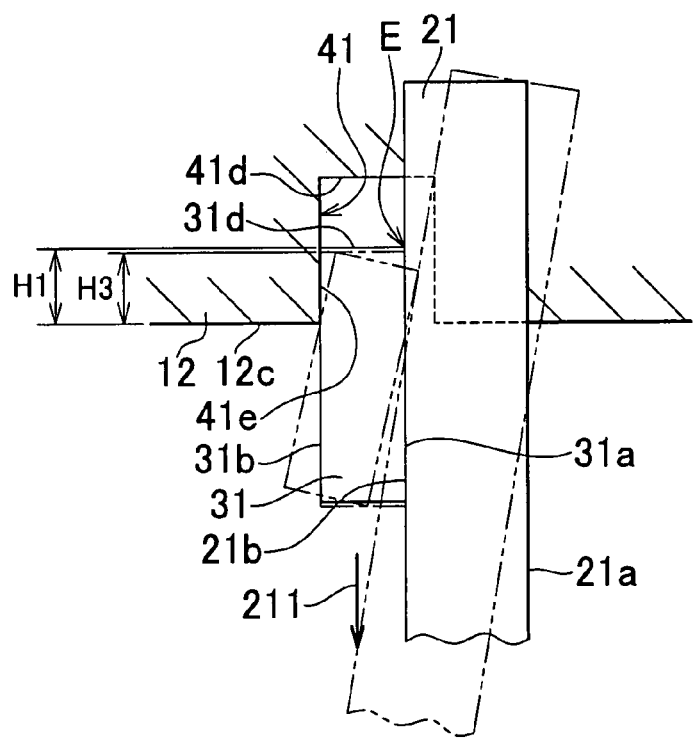
FIG. 12 is a cross sectional view of the brake support structure shown in FIG. 11 in which the view of the hydraulically released state of the snap ring is overlaid on the view of the initial state of the snap ring.

FIG. 11 are cross-sectional views of the brake support structure shown in FIG. 2, showing the initial state of the snap ring 31, the hydraulically pressed state of the snap ring 31, and the hydraulically released state of the snap ring 31, respectively. FIG. 12 is a cross sectional view in which the view of the initial state of the snap ring 31, the view of the hydraulically driven state of the snap ring 31, and the view of the hydraulically released state of the snap ring 31 are overlaid on each other.

Referring to FIG. 11 and FIG. 12, in the first exemplary embodiment, the static friction coefficient between the end face 31a and the end face 21b is set smaller than that between the end face 31b and the sidewall 41e. Thus, the frictional force that occurs between the snap ring 31 and the back plate 21 upon removal of the hydraulic pressure is made relatively small and the frictional force that occurs between the snap ring 31 and the sidewall 41e of the groove 41 upon removal of the hydraulic pressure is made relatively large, which reduces the movement of the snap ring 31 in the coming-off direction due to the behavior of the back plate 21 when the back plate 21 is returning from the inclined position to the initial position. Thus, according to the first exemplary embodiment, the bearing area between the snap ring 31 and the groove 41 becomes H3, which is larger than H2 in the comparative brake support structure shown in FIG. 10.

As such, the brake support structure according to the first exemplary embodiment, which supports the brake 11 as a frictional coupling device, includes the snap ring 31, the friction plates 13, 14, and the back plate 21, which is a plate member. The snap ring 31 fits in the groove 41 that extends in a circle about the axis 201 as a predetermined axis. The snap ring 31 restricts the positions of the friction plates 13, 14 in the direction in which the axis 201 extends. The friction plates 13, 14 frictionally engage each other when pressed towards the snap ring 31 in the direction in which the axis 201 extends.

The back plate 21 is arranged between the friction plates 13, 14 and the snap ring 31. The back plate 21 is pressed against the snap ring 31. The snap ring 31 has the end face 31a that is a first end face facing the back plate 21 and the end face 31b that is a second end face facing the opposite side from the end face 31a in the direction in which the axis 201 extends and in contact with the sidewall 41e of the groove 41. The back plate 21 has the end face 21b that is a third end face in contact with the end face 31a. The static friction coefficient between the end face 31a and the end face 21b is smaller than that between the end face 31b and the sidewall 41e of the groove 41.

From another viewpoint, the support structure for the brake 11 includes the snap ring 31, the friction plates 13, 14, and the back plate 21, which is a plate member. The snap ring 31 has the end face 31a that is a first end face that faces the back plate 21. The back plate 21 has the end face 21b that is a third end face in contact with the end face 31a. The oil grooves 51 are formed in at least one of the end face 31a and the end face 21b. Alternatively, an electroless nickel-plating layer 53, which will later be descried in connection with the second exemplary embodiment, may be formed on at least one of the end face 31a and the end face 21b.

Further, from another viewpoint, the support structure for the brake 11 includes the snap ring 31, the friction plates 13, 14, and the back plate 21, which is a plate member. The snap ring 31 has the end face 31a as a first end face that faces the back plate 21 and the end face 31b that is a second end face facing the opposite side from the end face 31a in the direction in which the axis 201 extends and in contact with the sidewall 41e of the groove 41. The surface of the end face 31b is formed as a rough surface that is rougher than the surface of the end face 31a.

According the support structure according to the first exemplary embodiment, which is configured as described above to support the brake 11, a sufficient bearing area can be obtained between the snap ring 31 and the groove 41 over the entire circumference about the axis 201. Thus, the planetary gearsets can operate more accurately with the brake 11 and the reliability of the automatic transmission 10 improves accordingly.

While the invention has been embodied as the support structure for supporting the brake 11 having the snap ring 31 that fits in the groove 41 via the internal periphery of the snap ring 31 in the first exemplary embodiment, the invention may alternatively be embodied as a support structure for supporting a brake having a snap ring that fits in the groove 41 via the external periphery of the snap ring. In this case, the snap ring comes off from the groove by moving from the inner side to the outer side in the radial direction with respect to the axis about which the groove extends in a circle.

Second Exemplary Embodiment

Figure 13:
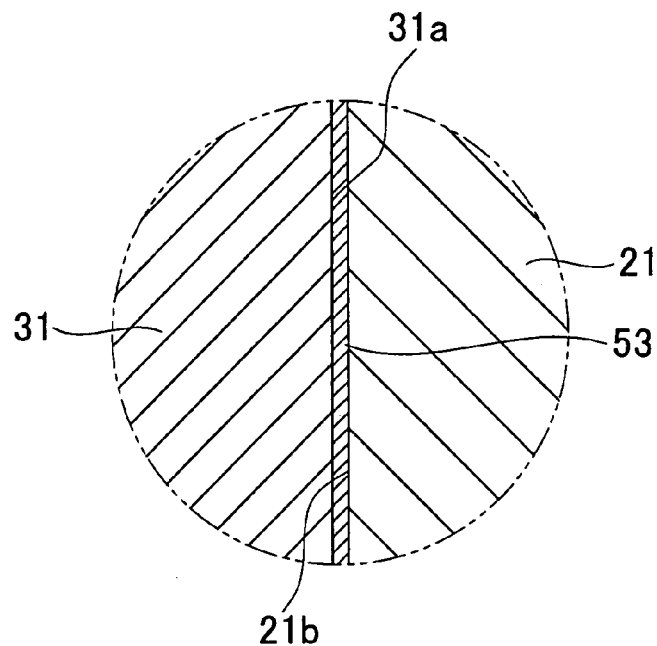
FIG. 13 is a cross-sectional view showing a brake support structure according to the second exemplary embodiment.

FIG. 13 is a cross-sectional view showing a brake support structure according to the second exemplary embodiment. Note that the portion shown in FIG. 13 corresponds to the portion indicated by the two-dotted line circle V in FIG. 2. The brake support structure of the second exemplary embodiment has basically the same structure as the brake support structure of the first exemplary embodiment, which supports the brake 11. Therefore, in the following descriptions, the components and elements that are the same as those in the first exemplary embodiment will not be described again.

Referring to FIG. 13, in the second exemplary embodiment, an electroless nickel-plating layer 53 is formed on the end face 31a of the snap ring 31. According to this structure, the static friction coefficient between the end face 31a and the end face 21b is effectively reduced and thus made smaller than the static friction coefficient between the end face 31b and the sidewall 41e, which reduces the movement of the snap ring 31 in the coming-off direction upon removal of the hydraulic pressure.

Note that the electroless nickel plating layer 53 may be formed on the end face 21b of the back plate 21 or on both the end face 31a and the end face 21b. Also, instead of an electroless nickel-plating, other coatings, such as a DLC (Diamond Like Carbon) coating and a molybdenum coating, may be applied to these end faces.

According to the frictional coupling device support structure of the second exemplary embodiment that is structured as described above, the same effects as those described above in connection with the first exemplary embodiment can be obtained.

Third Exemplary Embodiment

Figure 14:
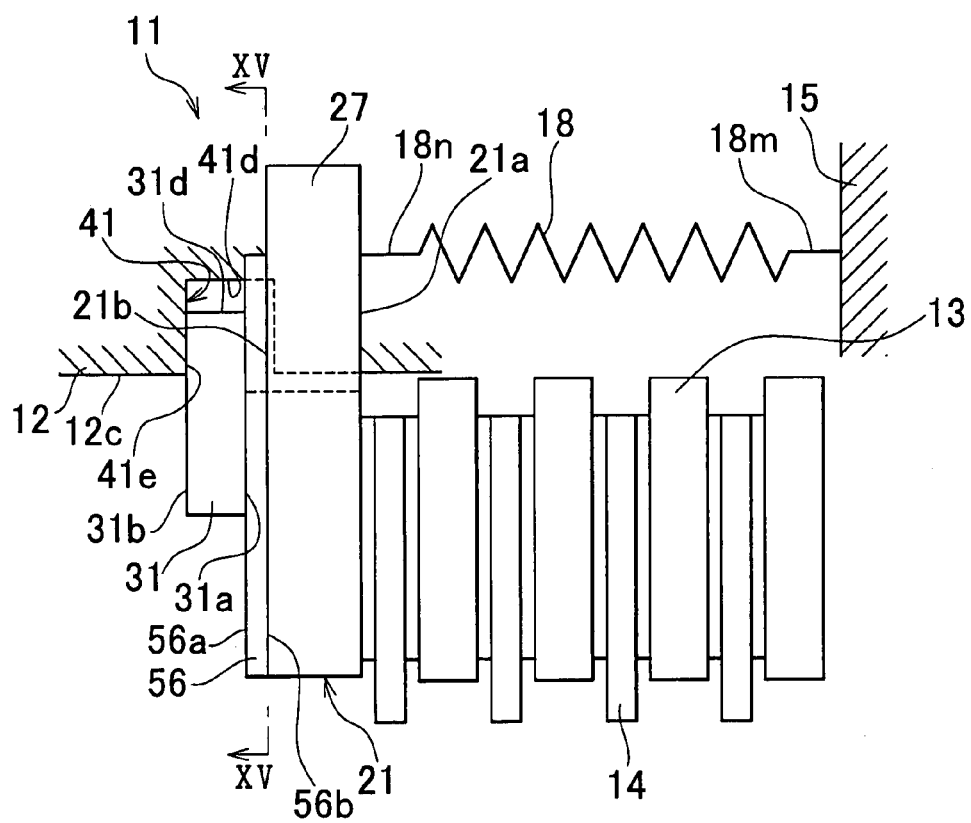
FIG. 14 is a cross-sectional view showing a brake support structure according to the third exemplary embodiment.
Figure 15:
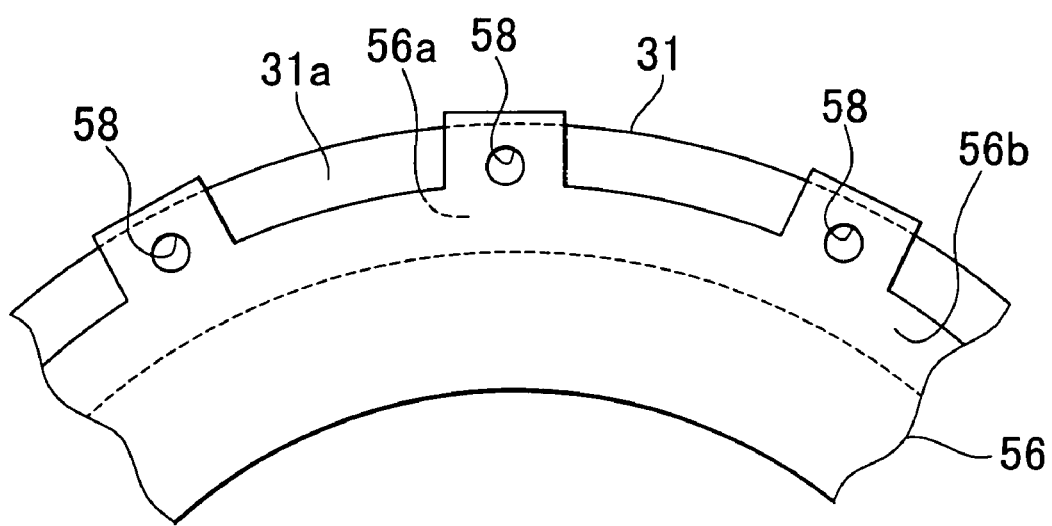
FIG. 15 is a cross-sectional view that is taken along the line XV-XV in FIG. 14.

FIG. 14 is a cross-sectional view showing a brake support structure according to the third exemplary embodiment. FIG. 15 is a cross-sectional view that is taken along the line XV-XV in FIG. 14. The brake support structure according to the third exemplary embodiment has basically the same structure as the brake support structure according to the first exemplary embodiment, which supports the brake 11. Therefore, in the following descriptions, the components and elements that are the same as those in the first exemplary embodiment will not be described again.

Referring to FIG. 14 and FIG. 15, in the third exemplary embodiment, an additional plate 56, which is an additional plate member, is provided between the back plate 21, which is an end plate portion, and the snap ring 31. In this structure, the back plate 21 and the additional plate 56 together form one example of a plate member in this invention. The additional plate 56 has an end face 56a that faces the snap ring 31 and is in contact with the end face 31a. The static friction coefficient between the end face 31a and the end face 56a is set smaller than that between the end face 31b and the sidewall 41e.

On the other hand, the additional plate 56 has an end face 56b that faces the opposite side from the additional plate 56a in the direction in which the axis 201 extends and is in contact with the end face 21b. Oil holes 58 are formed in the additional plate 56 so as to penetrate the additional plate 56 from the end face 56a to the end face 56b.

The oil holes 58 are circular through holes. However, the invention is not limited to such shapes of the oil holes 58. For example, the oil holes 58 may be formed oval or polygonal.

According to the structure described above, the static friction coefficient between the end face 31a and the end face 56a is effectively reduced and thus made smaller than the static friction coefficient between the end face 31b and the sidewall 41e. Also, owing to the oil holes 58 penetrating the additional wall 56 to the end face 56b thereof, the static friction coefficient between the end face 56b and the end face 21b is also reduced. This reduces the movement of the snap ring 31 in the coming-off direction upon removal of the hydraulic pressure.

According to the third exemplary embodiment, further, the stroke of the brake piston 15 that often varies among individual products can be adjusted by setting the thickness of the additional plate 56 accordingly. Moreover, forming the oil holes 58 in the additional plate 56 also contributes to reducing the weight of the brake and reducing the production cost of the brake.

According to the frictional coupling device support structure of the third exemplary embodiment that is structured as described above, the same effects as those described above in connection with the first exemplary embodiment can be obtained.

Note that the brake support structures of the first to third exemplary embodiments may be combined in various ways to provide a different brake support structure according to the invention.

While the invention has been described with reference to the example embodiment thereof, it is to be understood that the invention is not limited to the example embodiment and construction. To the contrary, the invention is intended to cover various modifications and equivalent arrangements. In addition, while the various elements of the example embodiment are shown in various combinations and configurations, which are exemplary, other combinations and configurations, including more, less or only a single element, are also within the sprit and scope of the invention.

What is claimed is:

1. A frictional coupling device support structure, comprising:
    a snap ring that fits in a groove extending in a circle about a predetermined axis;
    a friction plate, the position of which is restricted by the snap ring in a direction in which the predetermined axis extends and which is pressed against the snap ring in the direction in which the predetermined axis extends; and
    a plate member that is provided between the friction plate and the snap ring and that is pressed against the snap ring, wherein
    the snap ring has a first end face that faces the plate member and a second end face that face the opposite side from the first end face in the direction in which the predetermined axis extends and is in contact with a sidewall of the groove,
    the plate member includes a third end face that is in contact with the first end face,
    a static friction coefficient between the first end face and the third end face is smaller than a static friction coefficient between the second end face and the sidewall of the groove and the second end face is rougher than the first end face.

2. The frictional coupling device support structure according to claim 1, wherein
    an oil groove is formed in at least one of the first end face and the third end face.

3. A transmission including the frictional coupling device support structure according to claim 2.

4. The frictional coupling device support structure according to claim 1, wherein
    a surface treatment for reducing friction between the first end face and the third end face is applied to at least one of the first end face and the third end face.

5. A transmission including the frictional coupling device support structure according to claim 4.

6. The frictional coupling device support structure according to claim 1, further comprising:
    a piston member that is disposed on the opposite side from the plate member with respect to the friction plate and that presses the friction plate by moving towards the plate member, and
    an elastic member that is connected at one end to the piston member and at the other end to the plate member, and that urges the piston member in a direction away from the plate member, and that presses the plate member against the snap ring.

7. The frictional coupling device support structure according to claim 6, wherein
    the plate member includes an end plate portion to which the other end of the elastic member is connected and an additional plate portion that is interposed between the end plate member and the snap ring and has the third end face.

8. A transmission including the frictional coupling device support structure according to claim 6.

9. A transmission including the frictional coupling device support structure according to claim 7.

10. A transmission including the frictional coupling device support structure according to claim 1.

* * * * *